Figure 1:
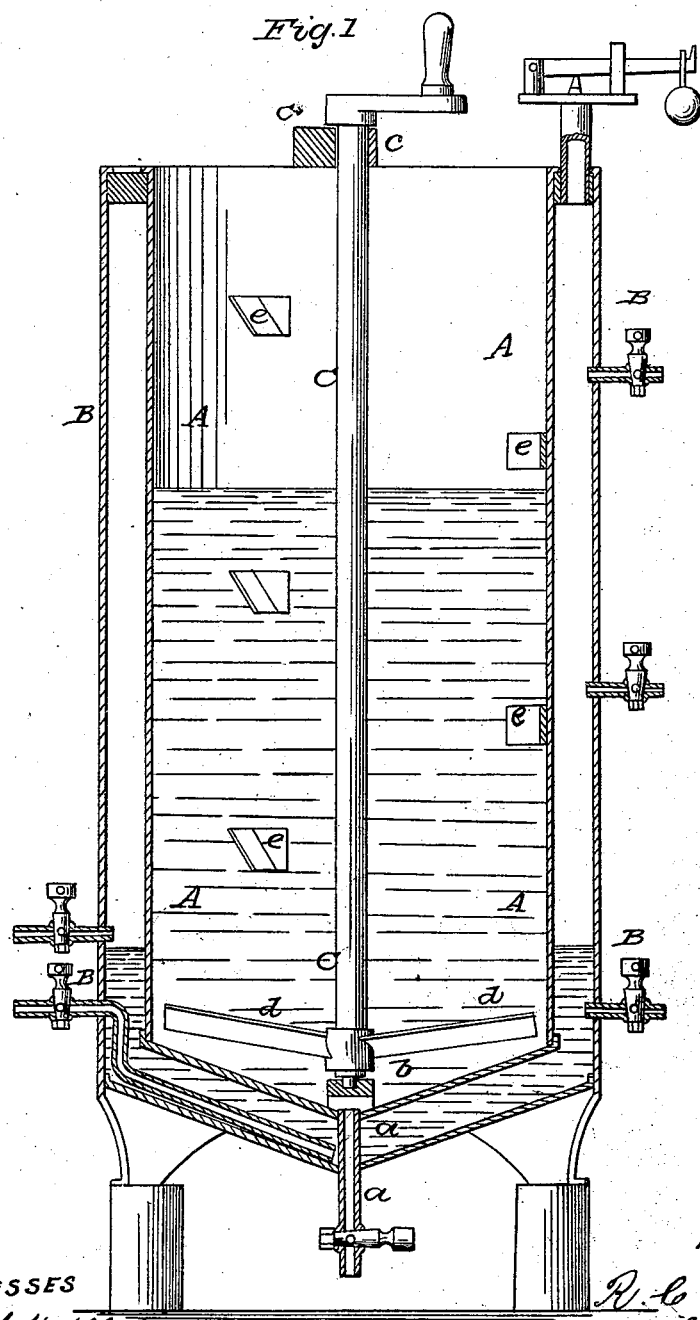

R. C. BARTON.
Purifying Oil and Fats.

No. 76,974. Patented April 21, 1868.

WITNESSES

INVENTOR

United States Patent Office.

RICHARD C. BARTON, OF BROOKLYN, NEW YORK.

Letters Patent No. 76,974, dated April 21, 1868.

IMPROVEMENT IN PURIFYING OILS AND FATS.

*The Schedule referred to in these Letters Patent and making part of the same.*

TO ALL WHOM IT MAY CONCERN:

Be it known that I, RICHARD C. BARTON, of Brooklyn, in the county of Kings, and State of New York, have invented a new and useful Improvement in Purifying and Decomposing Oils, Fats, &c.; and I do hereby declare that the following is a full, clear, and exact description thereof, which will enable others skilled in the art to make and use the same, reference being had to the accompanying drawing forming a part of this specification.

The drawing represents a sectional elevation of the apparatus in which I prefer to treat the fats according to my improved system.

This invention relates to a new process for purifying oils and fats, and for separating gelatine matter from fish and other oils, and consists more particularly in the use of ferment or protein, which, when added in the necessary proportions to an oil or fat, and when raised with the same to a certain required temperature, will extract from it all impurities, and will thus purify it completely.

For carrying on the purifying-process, I prefer to use the apparatus which is shown in the drawing, and which consists of a tank, A, fitted within an outer tank, B, and provided with a cock, a, at the bottom, to allow the contents to be drawn off. The outer surrounding vessel is provided with tubes for letting out and taking in water, steam, or other liquid. A vertical shaft, C, rests on a step, b, centrally within the inner tank, and is moreover held in place by arms c c, as shown. On the shaft C is a series of stirrers, d d, as shown, and from the inside of the tank may project lugs e e, to form detaining-surfaces for the contents to be stirred.

The operation is as follows:

The annular space around the vessel A is filled about two-thirds with water, the tank A is charged with the oil or fat to be treated, and the water is heated to about 90° to 95° Fahrenheit for oils, or to about 100° for fats.

The agitator C is occasionally turned to equalize the heat. When the oil or fat has acquired the required temperature, the ferment or protein is put into the tank A.

I prefer brewers' yeast for the purpose. The proportions are about three parts of yeast to about forty parts of oil or fat to be acted upon. The agitator is then briskly started until the yeast and material are thoroughly mixed, and is then stopped. Fermentation will then soon commence, and is allowed to proceed as long as the escape of gases from the material can be noticed. During fermentation, the material is kept as nearly as possible at a uniform temperature. The sediment yeast and the impurities of the oils or fats are then drawn off through the faucet a, and may be allowed to settle again, so as to allow any pure oil or fat drawn off with them to be re-collected. The contents of the tank A are then once more stirred to loosen sediments that might have remained in the material from the yeast. The material is then allowed to settle, to deposit any more impurities, and is cooled. It is then ready to be drawn off into suitable receptacles.

By the above process the poorest summer-pressed oil may be made to stand a much lower temperature, and to have its quality greatly improved.

When fats are treated, the same process will be observed as to ferments, but after fermentation, the fats are run off into suitable vessels to cool and granulate, and are then pressed as usually stearine is pressed. The oil produced from the first pressure should be put back into the tank, to have all moisture discharged. It is then, after being cooled, ready to be put into barrels or casks. The cakes of pressed lard or fat are then replaced into the tank, and are heated to 90° Fahrenheit, and some warm water is put in. After stirring, the fat is allowed to settle, and again pressed in a vertical press to separate the margarine.

The stearine is again put into the tank and treated as above, but is exposed to a higher temperature. After it has been drawn off it is put into granulating-pans, as is usually done in the manufacture of stearic acid.

Having thus described my invention, what I claim as new, and desire to secure by Letters Patent, is—

1. Purifying fats and oils, and decomposing them, to separate them from impurities and from gelatinous matter by means of ferment or protein, as set forth.

2. The process, herein shown and described, of treating oils and fats for purification, and for separating impurities.

3. The process, herein shown and described, of treating stearic acids.

4. The apparatus, herein shown and described, consisting of the tanks A and B, and of the agitator C, all made as set forth, for the purpose of treating fats and oils, in the manner specified.

RICHARD C. BARTON.

Witnesses:
 WM. F. McNAMARA,
 ALEX. F. ROBERTS.